even-column:

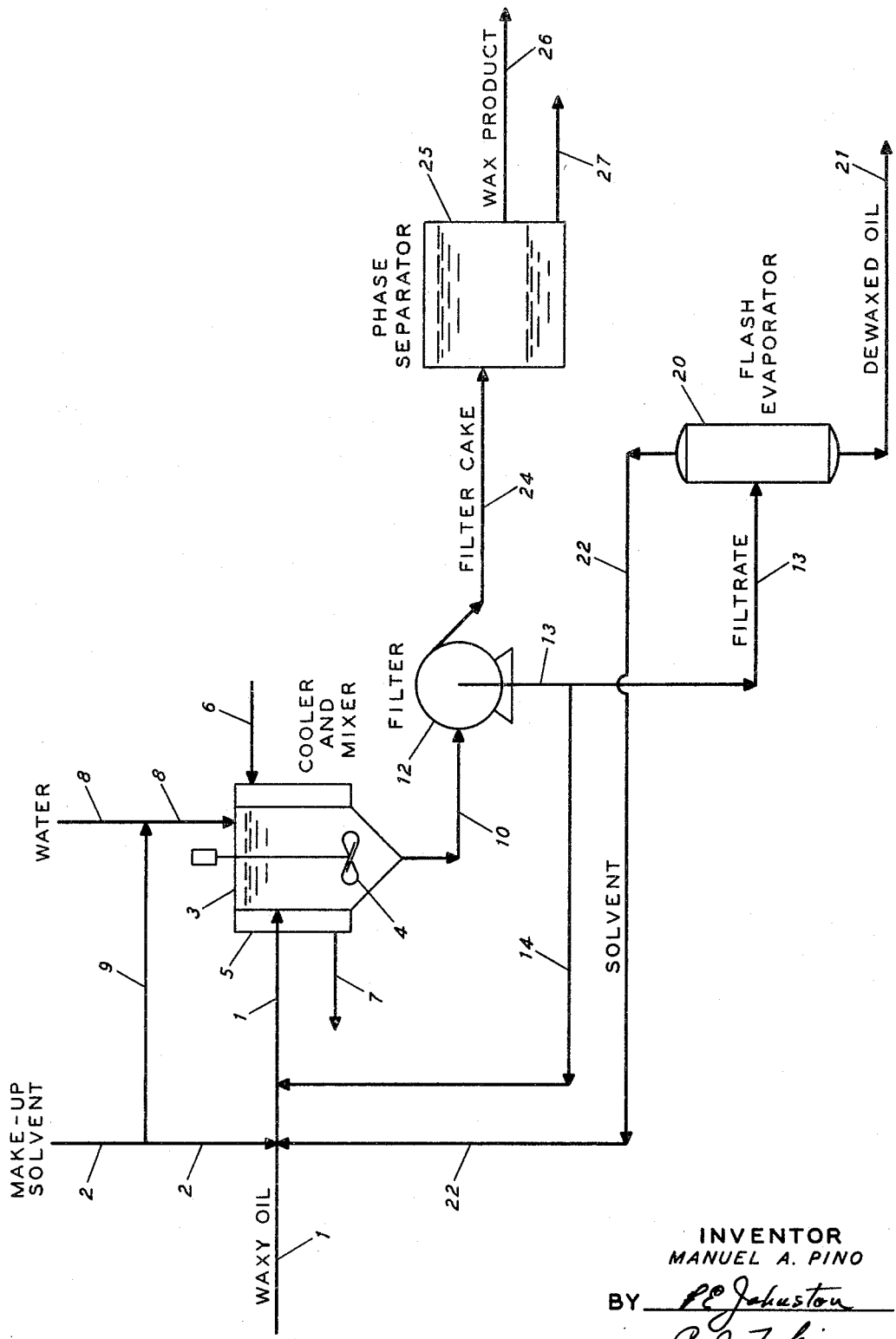

United States Patent Office 3,320,153
Patented May 16, 1967

3,320,153
PROCESS FOR DEWAXING OILS
Manuel A. Pino, Oakland, Calif., assignor to Chevron Research Company, a corporation of Delaware
Filed Dec. 10, 1964, Ser. No. 417,451
5 Claims. (Cl. 208—33)

The present invention is directed to the separation of wax from wax-containing oils to produce highly refined oils having very low pour points. More particularly, this invention relates to a dewaxing process for separating wax from waxy oils involving the use of water to improve the separation between the wax and oil.

There is an increasing demand for hydraulic fluids, lubricating oils and other functional fluids having very low pour points, i.e., those having a maximum pour point of about −60° F., which can be used in low temperature operation. Low-viscosity oils meet the pour point requirement, but they have the disadvantage of too low a viscosity for such use. Various thickening agents such as polymeric viscosity index improvers are added to these low-viscosity oils, but this results in fluids having other disadvantages including thermal and shear instability. Synthetic materials such as organic esters, phosphate esters and silicate esters are used to meet this demand for low pour point fluids, but they also have the disadvantage of thermal instability as well as other disadvantages including hydrolytic instability. Finally, silicone fluids have been used to meet this demand, but they have very poor lubricating properties. It has been found that high viscosity petroleum based fluids have good lubricating properties and meet the requirements of high thermal, shear and hydrolytic stability, but have pour points that are too high because they contain large quantities of paraffinic wax. Heretofore, the industry has not devised a suitable dewaxing process to free such fluids from paraffinic wax so that the resulting product has very low pour points as well as good thermal, shear and hydrolytic stability for use under the more severe operating conditions of, for example, supersonic jet aircraft.

The prior art shows dewaxing processes using solvents having a high ratio of oil solubility to wax solubility to obtain high yields of wax. Water has been added to dewaxing solvent-waxy oil mixtures before the mixtures are cooled in order to adjust the oil miscibility temperature of the solvent. In Patent No. 2,674,565 it is shown that by adding water and a surface active agent to the solvent-waxy oil mixture before cooling, filtration rates are improved. However, in this patent it is shown that the addition of water alone without the surface active agent results in stoppage of the filtration rate after the filtration is three-fourths complete. In Patent No. 2,734,849 it is stated that the presence of water impairs the filtration efficiency during the primary filtration. In Patent No. 2,743,213 it is shown that aqueous solvents are added to a repulped wax cake for deoiling after the repulped wax cake has been cooled to deoiling temperatures of about 35°–80° F., preferably 50°–70° F.

In contrast to these prior processes, the present invention is directed to a dewaxing process wherein water is added to a solvent-waxy oil mixture after the mixture is cooled below the freezing point of water and wax crystals have been formed. This process results in an improvement in the filtration characteristics in the separation of waxes having very low oil-content from waxy oils. The resulting dewaxed oils are highly refined and have very low pour points. This separation is achieved at high filtration rates without the use of surface active agents.

Therefore, it is an object of the present invention to provide a more efficient solvent dewaxing process for separating wax from waxy oil mixtures than prior processes. It is a more specific object of the present invention to provide a solvent dewaxing process having improved filtration rates. It is a further object of the present invention to produce paraffinic wax having very low oil-content. It is still a further object of the present invention to produce hydraulic fluids, lubricating oils and other functional fluids having very low pour points and good thermal, shear and hydrolytic stability.

This invention will be more clearly understood and further objects and advantages thereof will be apparent from the following description when read in connection with the accompanying drawing which is a diagrammatic illustration of the process units and flow paths suitable for carrying out the present invention.

In accordance with the present invention there is provided a process for dewaxing waxy oils which comprises mixing said oil with a dewaxing solvent, cooling the resultant mixture to a temperature below the freezing point of water to form a wax crystal slurry, adding water to the cold slurry of wax crystals in an amount equal to at least 25% by weight of the wax in said slurry that crystallizes at said temperature and then filtering the cold slurry to recover a filter cake comprising solid wax and ice.

In a more specific embodiment of the present invention there is provided a process for dewaxing waxy oils which comprises mixing said oil with a solvent selected from the group consisting of ketones having from 3–9 carbon atoms per molecule, cooling the resultant mixture to a temperature from about −60° to −100° F. to form a slurry of wax crystals, adding to the cold slurry said solvent containing water in an amount equal to at least 25% by weight of the wax in said slurry that crystallizes at said temperature, filtering the cold slurry to recover a filtrate and a filter cake comprising solid wax and ice, removing said solvent from said filtrate to produce an oil having a maximum pour point of about −60° F.

While no attempt will be made to set forth in detail any theory to explain the mechanism of the improved wax separation process, it will suffice to state that in accordance with the present invention ice is believed to form around the dispersed wax crystals in the cooled solvent-waxy oil mixture. This results in large crystals which are easily separated from the solvent-oil mixture. It has been found that the ice coated crystals produced by means of the present invention have a greater filter retention than prior processes. That is, the ice coated wax has less tendency to be pushed through the filter pores under the filter conditions employed than the non-coated wax. It has also been found that there is less oil occlusion in the filter cake from the present process than prior processes.

Any wax-containing hydrocarbon oil may be dewaxed by means of the process of the present invention. However, for producing the very low pour point dewaxed oils, a waxy oil having a viscosity of 1–10,000 centistokes (cs.) at 100° F. is preferred.

A suitable solvent for dewaxing should have a low viscosity coefficient and a high ratio of oil solubility to wax solubility. Examples of suitable solvents include propane, acetone, methyl ethyl ketone (MEK), methylpropyl ketone, methyl isopropyl ketone (MIPK), methyl isobutyl ketone (MIBK), trichloryl ethylene, ethylene dichloride and mixtures such as MEK benzene mixtures, ethyl carbonate-propane mixtures, ethylene-dichloride benzene mixtures. The preferred solvent is a ketone having 3–9 carbon atoms per molecule or a mixture of such ketones.

The waxy oil-solvent mixture is cooled to a temperature below the freezing point of water, preferably 0° to −100° F. to form a wax crystal slurry, water is added to the cold slurry of wax crystals and then the cold slurry is filtered at temperatures below the freezing point of water, preferably 0° to −100° F. The amount of water that is added should be at least 25% by weight of the wax in the wax crystal slurry that crystallizes at the above temperatures, preferably in an amount equal to the wax-content of this slurry. It is preferable to add the water as a solution (usually about 75%) in a suitable ketone.

Any suitable method of filtration may be used for the process of the present invention, such as gravity filters, pressure filters, vacuum filters or centrifuges.

Referring now to the drawing there is shown a simplified illustration of an embodiment of the process units and flow paths suitable for carrying out the process of the present invention.

A waxy oil through line 1 is combined with a suitable dewaxing solvent through line 2 and the combined stream is passed through line 1 to cooler and mixer 3. The combined stream is stirred by agitator 4 and cooled below the freezing point of water by coolant entering cooling jacket 5 through line 6 and leaving through line 7 to form a wax crystal slurry. As an alternative the combined stream may be cooled in cooler and mixer 3 by direct contact with coolant. Water through line 8 is combined with a suitable solvent through line 9 and the aqueous solution is passed through line 8 to cooler and mixer 3. The aqueous solution and the wax crystal slurry are thoroughly mixed by agitator 4 and the mixture is brought to proper filtration temperatures, i.e., at least below the freezing point of water, by means of cooling jacket 5. The mixture is then passed to filter 12. While the simplified illustration of the present invention depicts a rotary filter, it has been found that a 15–30 mesh screen placed in the bottom of cooler and mixer 3 is all that is required to provide an effective means for separating the solid wax-ice filter cake from the filtrate. The filtrate from filter 12 may be recycled through line 14 to cooler and mixer 3 to recool the mixture to proper filtration temperature, if necessary. The filtrate is passed through line 13 to flash evaporator 20 where the dewaxed oil is separated from the solvent and removed through line 21 to product storage. The solvent is removed through line 22 and combined with the waxy oil through line 1. The filter cake from filter 12 is passed through line 24 to phase separator 25 where the wax is separated from the water and removed through line 26 to product storage. The water removed through line 27 may be combined with the water through line 10 and reused or it may be discarded. The wax product may be repulped with solvent and passed through the same steps of secondary filtration as the primary filtration steps discussed in the foregoing.

The following examples illustrate the present invention:

*Example 1*

The feed used in this example was a narrow boiling paraffinic white oil having the properties given in Table I below.

TABLE I

Distillation at 10 mm. Hg:
 LV percent—
  St. _____ ° F__ 363
  10 _____ ° F__ 428
  30 _____ ° F__ 431
  50 _____ ° F__ 434
  70 _____ ° F__ 440
  90 _____ ° F__ 449
  95 _____ ° F__ 462
Viscosity at 100° F. _____ SSU__ 75.3
Gravity _____ ° API__ 36.7
Pour point _____ ° F__ 10

In one experiment 200 grams of this white oil were mixed with 1600 grams of a dewaxing solvent comprising 1 part MEK to 3 parts MIBK at room temperature in a cooler and mixer containing a 30 mesh wire filter screen in its cone-shaped bottom. An aqueous solution comprising 30 ml. of MEK and 90 ml. of water was added to the cooler and mixer and cooled to −65° F. in 40 minutes by direct contact with pulverized solid $CO_2$, while the resultant oil-solvent-water mixture was constantly stirred. During this cooling period there was a tendency for the water in the mixture to freeze out of solution onto surfaces of the cooler-mixer and to plug the drain hole at the bottom of the vessel. The mixture was stirred an additional 10 minutes after it had been cooled to −65° F. and then allowed to settle for 5 minutes. The filtrate, approximately 1200 ml., was removed from the bottom of the cooler and mixer at a maximum filtration rate of 30 ml./min. The resultant filter cake on the 30 mesh screen was washed with 500 ml. of the solvent precooled to −65° F. The wash solvent, approximately 500 ml., was drawn off at a rate of 27.8 ml./min. The filter cake was melted, water and residual solvent were removed, and 68.7 grams of wax product were recovered. The solvent was evaporated from the filtrate and 131.3 grams of dewaxed oil were recovered having the properties given in Table II below.

In another experiment the same oil-solvent mixture was cooled to −65° F. in the same manner as above. The mixture was stirred for an additional 10 minutes after it was cooled to −65° F. and then the aqueous solution comprising 30 ml. of MEK and 90 ml. of water was added while maintaining the mixture at −65° F. with constant addition of the $CO_2$ coolant. There was no tendency for the water to freeze out of solution on the walls of the vessel as it did in the above experiment; rather the water formed an ice coating on the wax crystals. The mixture was stirred for an additional 10 minutes and then allowed to settle for 5 minutes. The filtrate, approximately 1700 ml., was removed from the bottom of the cooler and mixer at a maximum filtration rate of 48.6 ml./min. The resultant filter cake on the screen was washed with 500 ml. of solvent precooled to −65° F. The wash solvent and residual filtrate, approximately 525 ml., were removed at a rate of 42.8 ml./min. The filter cake was melted, water and residual solvent were removed and 48.7 grams of wax product were recovered. The solvent was evaporated from the filtrate and 151.3 grams of oil were recovered having the properties given in Table II below.

TABLE II

|  | Addition of Water Before Cooling | Addition of Water After Cooling |
|---|---|---|
| Yield, wt. percent of oil feed | 65.7 | 75.7 |
| Maximum filtration rate, ml./min | 30 | 48.6 |
| Viscosity, c.s.: |  |  |
|  At 210° F | 3.315 | 3.326 |
|  At 100° F | 15.38 | 15.54 |
|  At −40° F | 3,878 |  |
| Pour point, ° F | −60 | −65 |

The above two experiments of this example illustrate the advantages of the present invention, which involves the addition of water after cooling a waxy oil-solvent mixture to the desired filtration temperature. Table II summarizes some of these advantages. The addition of water after cooling results in a yield of dewaxed oil based on the weight of white oil feed that is 15% greater, a substantially higher filtration rate which is of great economic and practical importance, and a pour point for the dewaxed oil that is 5° F. lower than the addition of water before cooling. Hence, the process of the present invention gives a higher yield of a better quality dewaxed oil. Further, the present invention makes it possible to make a sharp separation between wax and oil in a one-step operation. Still further, these results indicate that by means of the present invention a waxy oil can be more easily and more efficiently converted into a premium quality dewaxed oil of very low pour point such as are required for supersonic jet aircraft.

*Example 2*

A batch of deep dewaxed oil was prepared for qualification under the U.S.A.F. MIL–H–27601 specification for hydraulic fluids for use in supersonic jet aircraft. The dewaxing operation in accordance with the present invention was done in a cooler-mixer having a 90° cone bottom. An 18-inch diameter leaf filter having a 14-mesh screen was inserted 12 inches above the base of the cone bottom. Cooling was done by injecting liquid $CO_2$ at 250 p.s.i.g. through an expansion valve below the surface of liquid In this preparation 77.7 pounds of the white oil of Table I were mixed with 623 pounds of the same dewaxing solvent as in Example 1. The mixture was cooled to −80° F. to form a slurry of wax crystals. An aqueous solution containing water in an amount equal to about the weight of the wax in the slurry at −80° F. was added to the slurry. The composition of the aqueous solution was 32.6 pounds of water and 25.8 pounds of acetone. The slurry was cooled to −85° F. and filtered to recover a wax cake and a filtrate. The solvent was evaporated from the filtrate and a 52.8 wt. percent yield of dewaxed oil based on the white oil feed was obtained.

Because of the rather inefficient pilot plant equipment used in this example, a recrystallization operation was undertaken to obtain a better yield of deep dewaxed oil. In the recrystallization operation the wax cake from the first crystallization was redissolved in 160 pounds of dewaxing solvent and cooled to −62° F. About 13.4 pounds of the same aqueous solution used in the first crystallization was added to the slurry of wax crystals. The slurry was cooled to −65° F. and filtered to recover a wax cake and a filtrate. The solvent was evaporated from the filtrate. The resulting dewaxed oil was blended with that obtained from the first crystallization for an over-all yield of 70 wt. percent based on the white oil feed. The properties of the blend of deep dewaxed oil obtained in this example are given in Table III below.

TABLE III

Viscosity:
 At 210° F. _____cs__ 3.218
 At 100° F. _____cs__ 14.62
 At −40° F. _____cs__ 3717
Viscosity index _____ 91
Pour point _____° F__ −65

Various additives were added to the deep dewaxed oil blend to improve its oxidation stability and lubricating quality without appreciably affecting its other properties in order to meet the U.S.A.F. MIL–H–27601 specification.

The deep dewaxed oil blend prepared to meet U.S.A.F. MIL–H–27601 specification was tested for thermal stability. The thermal stability test was conducted in a 46 ml. capacity stainless steel pressure cylinder. The cylinder was charged with a 20 ml. sample of the blend and the proper catalysts. The catalysts consist of M–10 tool steel, 52100 steel, and naval bronze in the form of 0.5 inch ball bearings. The system was purged with $N_2$ and sealed at atmospheric pressure. The temperature in the system was raised to 700°±10° F. and maintained for 6 hours. The nitrogen pressure in the system at 700° F. was 20 p.s.i.g. The viscosity of the sample after the thermal stability test was 12.39 cs. at 100° F. or a 15.25% decrease from its viscosity before the test. The change in catalyst weight was 0.08 mg./cm.$^2$ for the M–10 tool steel, and for the 52100 steel and 0.04 mg./cm.$^2$ for the naval bronze. The acid number of the sample was 0.03 compared with 0.01 before the test. In addition to good thermal stability, the deep dewaxed oil blend has (1) good shear stability because of the absence of polymeric materials which cause degradation under shear stresses, (2) good hydrolytic stability because hydrocarbon-based fluids, in general, are very resistant to reaction with water, and (3) superior lubricating properties which is common for the hydrocarbon-based fluids. None of the prior art substitutes for hydraulic fluids, lubricating oils, and other functional fluids having such low pour points for use in low temperature operations have all of these properties. For example, low viscosity hydrocarbon-based fluids with V.I. improvers conforming to U.S.D.O.D. MIL–H–5606B specification for hydraulic fluids for use in military aircraft are very susceptible to shear degradation because the V.I. improvers contain polymeric materials which are easily fragmented. For another example, dimethyl silicones are known to have inferior lubricating characteristics. For another example, alkyl aryl phosphate esters are deficient in thermal stability because they tend to decompose under sustained use at temperatures over 275° F. For still another example, silicate esters conforming to the U.S.D.O.D. MIL–H–8446B specification for hydraulic fluids for use in military aircraft are less satisfactory for use in supersonic aircraft than deep waxed oil because of their limited resistance to hydrolysis, which can cause the formation of harmful solid materials and because of their susceptibility to shear degradation.

Although only specific embodiments of the present invention have been described, numerous variations could be made in those embodiments without departing from the spirit of the invention, and all such variations that fall within the scope of the appended claims are intended to be embraced thereby.

I claim:
1. A process for dewaxing waxy oils which comprises mixing said oil with a dewaxing solvent, cooling the resultant mixture to a temperature below the freezing point of water to form a slurry of wax crystals, before filtration adding water to the cold slurry of wax crystals in an amount equal to at least 25% by weight of the wax in said slurry that crystallizes at said temperature, and then filtering the cold slurry to recover a filter cake comprising solid wax and ice.

2. The process of claim 1, wherein said dewaxing solvent is selected from the group consisting of ketones having 3–9 carbon atoms per molecule.

3. The process of claim 1, wherein said resultant mixture is cooled to a temperature from about 0° to −100° F.

4. The process of claim 2, wherein the water is added in the presence of said solvent.

5. A process for dewaxing waxy oils which comprises mixing said oil with a dewaxing solvent selected from the group consisting of ketones having from 3–9 carbon atoms per molecule, cooling the resultant mixture to a temperature from about −60° F. to −100° F. to form a slurry of wax crystals, adding to the cold slurry, before filtration, said solvent containing water in an amount equal to at least 25% by weight of the wax in said slurry that crystallizes at said temperature, filtering the cold slurry to recover a filtrate and a filter cake comprising solid wax and ice, and removing said solvent from said filtrate to produce an oil having a maximum pour point of about −60° F.

References Cited by the Examiner
UNITED STATES PATENTS
2,670,083  2/1954  McKay _____ 208—38
2,726,987  12/1955  Macke _____ 208—33

DANIEL E. WYMAN, *Primary Examiner.*

P. E. KONOPKA, *Assistant Examiner.*